Figure 1:
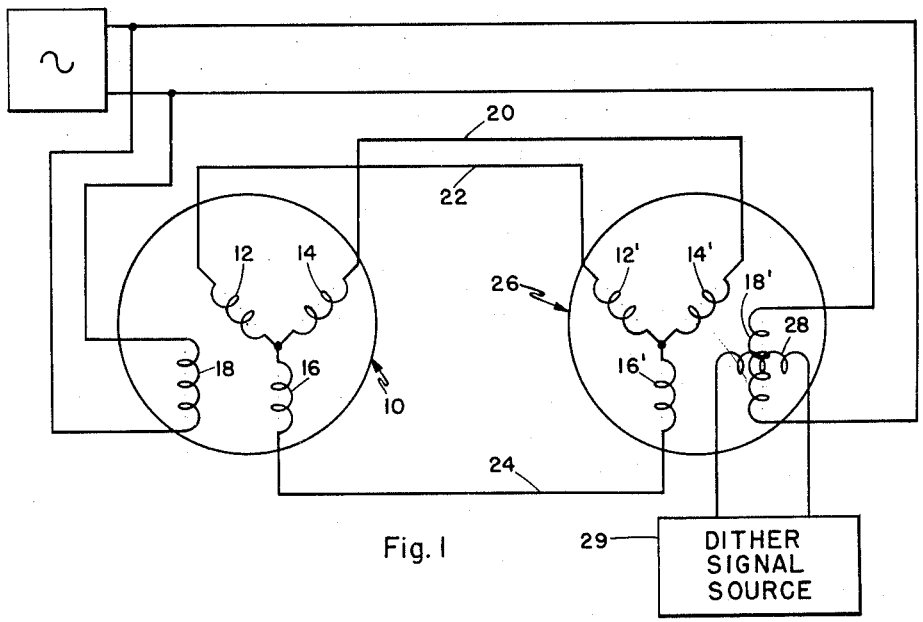

Nov. 28, 1961     L. E. HURTT ET AL     3,011,109

SYNCHRO STATIC FRICTION ELIMINATOR CIRCUIT

Filed Dec. 27, 1960

INVENTORS
LEON E. HURTT
HAROLD E. BEACH
BY

Knox & Knox

ય
3,011,109
SYNCHRO STATIC FRICTION ELIMINATOR CIRCUIT

Leon E. Hurtt, La Mesa, and Harold E. Beach, San Diego, Calif., assignors to The Ryan Aeronautical Co., San Diego, Calif.
Filed Dec. 27, 1960, Ser. No. 78,449
8 Claims. (Cl. 318—24)

This invention relates to a self-synchronous system, and more particularly to means for overcoming the static friction thereof.

In present-day technology, there is an increasing trend toward having a large number of remotely-positioned pickup devices present their information at a central point. Frequently the pickup device consists of a mechanism which produces an electrical output which varies as the angular position at its shaft. In turn, the mechanism is arranged so that its shaft's angular position will vary with the incoming data. Examples of this type of pickup devices are those that measure wind velocity or wind direction. It is often impractical to have a mechanical connection, such as a cable or system of levers, between the shaft of the pickup device—which may be on the roof of a building, and the central station—which may be in the basement. Therefore, other means are necessary to cause the pointer at the central station to indicate the correct velocity or direction on a dial.

One solution to this problem is the use of "self-synchronizing" devices, such as Selsyn "motors" manufactured by General Electric. These take the form of a pair of "motors" that have the property that when the shaft of the "transmitter" motor at the pickup device assumes a particular angular position, the shaft of the "receiver" motor at the central station assumes the same angular position. Moreover, as the shaft of the transmitter rotates, the shaft of the receiver also rotates in a corresponding manner—thus the term self-synchronous.

It is well known that when a rotation occurs, a "dynamic" friction condition exists between the moving and stationary parts—the term dynamic indicating movement. Various types of bearings and/or lubrication are used to minimize this dynamic friction.

It is also known that when relatively movable parts are stationary, there is a "static" friction condition that must be overcome before motion can be established—the term static indicating a stationary condition. This static friction is relatively large, and may be roughly visualized as the congealing of a lubricant. A bearing exhibits a corresponding phenomenon.

It will be readily recognized that when the incoming data to a self-synchronous system is only slightly different from preceding data, there is only an extremely small rotation torque produced at the receiver. Furthermore, when the receiver shaft has been at rest, it has an inherent static frictional condition that opposes any incipient motion. The small torque is unable to overcome the static friction; and this condition makes the receiver—and thus the overall system—insensitive to small changes. This is undesirable.

It is therefore the principal object of our invention to provide means for overcoming static friction.

Figure 2:
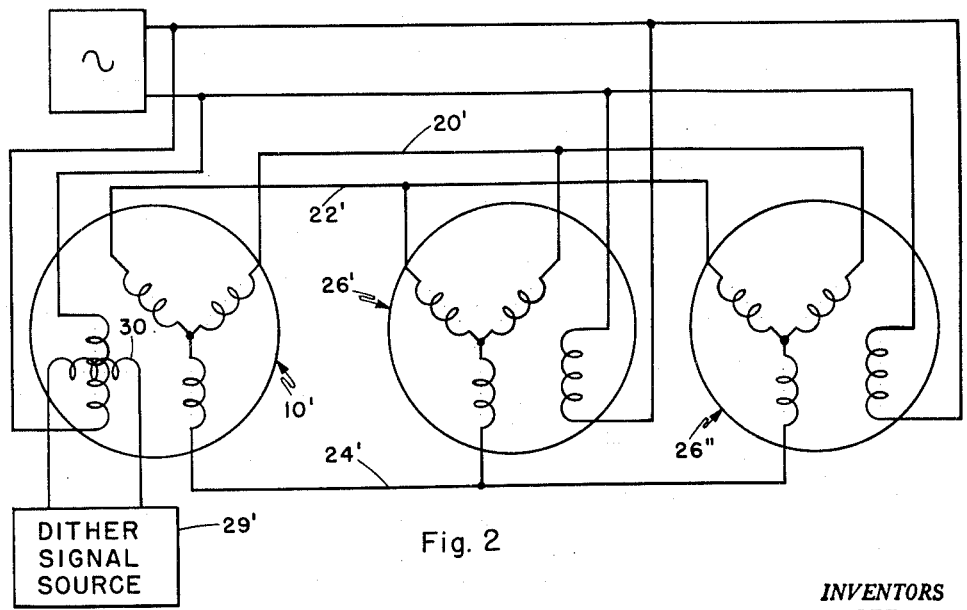

The attainment of this object and others will be realized from the following specification taken in conjunction with the drawings of which:

FIGURE 1 illustrates our basic inventive concept; and
FIGURE 2 shows another embodiment thereof.

Broadly speaking, our invention imparts to the rotor, a minute oscillation that prevents the establishment of a static friction condition.

Our invention will be better understood from the following discussion of electric motors. Electric motors, in general, operate on the principle that electricity flows through a stationary "field." Coils of wires, known as "windings," establish a magnetic field. Electricity also flows through an "armature" winding to produce a second magnetic field. The resultant repulsion caused by the magnetic fields causes the armature to rotate; the amount, duration, and speed of rotation depending on the strength and duration of the flow of electricity.

The previously indicated self-synchronous motors are devices that are electrically interconnected so that mechanical rotation of the shaft of the transmitter motor establishes in the receiver motor particular magnetic fields that cause the receiver shaft to assume the same angular position as the shaft of the transmitter motor. The connections are shown schematically in FIGURE 1. Here a transmitter motor 10 is shown to have three field windings 12, 14 and 16, connected in the form of a Y. Other winding and connection configurations are known. Another winding 18 is wound on the rotor that is connected with the motor's shaft; the rotor and shafts being omitted for clarity. Winding 18 has applied thereto an alternating current signal. When the transmitting motor's shaft is positioned at a particular angular position by the pickup device, the windings produce a given magnetic relation, and this relation produces electrical energy that is transmitted over wires 20, 22, and 24 to windings 12', 14' and 16' of receiver motor 26. The receiver thereupon produces a corresponding internal magnetic field relation; and its rotor assumes the same angular position as the shaft of the transmitter.

Thus, the shafts of the transmitter and the receiver are in the same angular position. As new incoming data rotates the shaft of the transmitter, the balance therein is disturbed, and causes the shaft of the receiver to assume a new position, that again corresponds to that of the transmitter's shaft. As previously pointed out, however, static friction prevents the receiver's shaft from rotating in response to small changes in the shaft position of the transmitter.

The foregoing simplified explanation has implied that the field windings are stationary, while the armature windings rotate. In actuality the windings may be interchanged in accordance with recognized principles.

According to our invention, receiver 26 has an additional "dither" winding 28 on its rotor, and to this dither winding is applied on alternating current "dither" signal from a dither signal source 29. This dither signal causes winding 28 to produce a magnetic field, and a repulsion is produced between this dither field and the magnetic field produced by winding 12', 14' and 16'. The rotor therefore starts to rotate, but before its gets very far the dither signal reverses itself, and the rotor moves back in the opposite direction.

The magnitude of the dither signal is normally just large enough to prevent the establishment of a static friction condition. It may be somewhat larger than this normal value, in which case small oscillations will result, or it may be somewhat less than this normal value, in which case the static friction will only be reduced, but not entirely eliminated. Thus the rotor movement is normally small or absent entirely. Now, when a small signal is received from the transmitter, the receiver's shaft is already on the verge of rotating, and it rotates readily in response to the transmitter's signal.

Assume for the moment that the transmitter shaft is stationary, that the receiver shaft has assumed its corresponding stationary position, and that the receiver's shaft is now manually rotated and then released. It then rotates toward its normal position, overshoots, reverses direction, overshoots and repeats the sequence again. This movement is called oscillation. The oscillation will rapidly die out, and the shaft will settle back to its original position. The frequency at which the oscillation occurs is known as the resonant frequency of the system. It is sometimes preferable that the dither signal frequency be such as to excite the rotor to oscillate at or near this frequency.

Dither signal source 29 may be designed so that the dither signal has the desired properties. Alternatively, source 29 may have controls that influence the frequency and amplitude of the dither signal.

The dither signal may be a sinewave, a series of pulses, or any other convenient waveform.

It may thus be seen that due to our invention, the effects of static friction are overcome.

FIGURE 2 shows our invention used in another manner. At times it is desirable for a single transmitter 10′ to energize several receivers 26′, 26″, etc. This may be done as shown in FIGURE 2 by connecting the various receivers in parallel. However, rather than have a dither signal applied to each receiver, the dither signal in FIGURE 2 is applied to a dither winding 30 in the transmitter 10′. The resultant magnetic field therein produces electrical variations that are transmitted over wires 20′, 22′, and 24′ to the various receivers. In this way each receiver rotor oscillates in accordance with the dither signal as previously explained, and all the receivers thus overcome the effects of static friction.

It is obvious that our inventive concept may be applied to other elements, such as motors, resolvers, etc., that are faced with a similar problem.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

We claim:

1. In an element of the type having a rotor that may assume a given stationary position whereby a static frictional condition is established, the improvement comprising: means for causing said rotor to have an oscillatory state; said means comprising a dither winding; means for applying a dither signal to said dither winding; and means for causing said dither signal to be at the resonant frequency of said element.

2. In an element of the type that has a rotor that may assume a given stationary position, whereby a static friction might be established, the improvement comprising: means for causing said rotor to have an oscillatory state; said means comprising a dither winding; means for applying a dither signal to said dither winding; and means for causing said dither signal to have an amplitude just large enough to overcome said static friction.

3. In an element of the type that has a rotor that may assume a given stationary position, whereby static friction might be established, the improvement comprising: means for causing said rotor to have an oscillatory state; said means comprising a dither winding; means for applying a dither signal to said dither winding; means for causing said dither signal to be at the resonant frequency of said element; and means for causing said dither signal to have an amplitude just large enough to overcome said static friction.

4. A self synchronous system comprising: a transmitter motor and a receiver motor; said motors having field windings and a rotor winding; one of said motors having a dither winding; means for interconnecting said field windings; means for interconnecting said rotor windings; and means for energizing said dither winding, whereby said rotor is in an oscillatory state.

5. A self synchronous system comprising: a transmitter motor having field windings and a rotor winding; a receiver motor having field windings, a rotor winding, and a dither winding; means for interconnecting said field windings; means for interconnecting said rotor windings; means for energizing said rotor windings; and means for applying a dither signal to said dither winding of said receiver motor, whereby the rotor of said receiver is in an oscillatory state.

6. The combination of claim 5 including means for causing said dither signal to be at the resonant frequency of said receiver motor; said dither signal having an amplitude just large enough to overcome the static friction condition.

7. A self synchronous system comprising: a transmitter motor having field windings, a rotor winding, and a dither winding; a plurality of receiver motors; each said receiver motor having field windings and a rotor winding; means for interconnecting said field windings; means for interconnecting said rotor windings; means for energizing said rotor windings; and means for energizing said dither winding of said transmitter motor, whereby the rotors of said receivers are in an oscillatory state.

8. A self synchronizing system comprising: a transmitter; said transmitter having field windings, a rotor winding, and a dither winding; a plurality of receivers; each of said receivers having field windings and a rotor winding; means for interconnecting said field windings; means for interconnecting said rotor windings; means for energizing said rotor widings from an A.C. source; means for energizing said dither winding with a dither signal whose frequency is the same as the resonant frequency of said receivers, and whose amplitude is just large enough to overcome the static friction condition of said receivers, whereby the rotors of said receivers are in an oscillatory state.

References Cited in the file of this patent

UNITED STATES PATENTS

| | | |
|---|---|---|
| 2,532,723 | Knoop | Dec. 5, 1950 |
| 2,688,112 | Wimberly | Aug. 31, 1954 |